(12) United States Patent
Iwakawa et al.

(10) Patent No.: US 6,208,433 B1
(45) Date of Patent: Mar. 27, 2001

(54) IMAGE PICK-UP APPARATUS CAPABLE OF STABLE FLICKER COMPENSATION WITHOUT INFLUENCE BY REFLECTANCE OF AN OBJECT

(75) Inventors: Masato Iwakawa; Hiroyuki Mutou, both of Tokyo; Hajime Yamamoto, Kanagawa; Tomoaki Fukano, Tokyo, all of (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/062,032

(22) Filed: Apr. 17, 1998

(30) Foreign Application Priority Data

Apr. 18, 1997 (JP) .................................... 9-101245

(51) Int. Cl.[7] ....................................... H04N 1/38
(52) U.S. Cl. ............................................. 358/463
(58) Field of Search ................... 358/475, 474, 358/506, 483, 482, 513, 497, 494, 463; 348/227, 226, 228

(56) References Cited

U.S. PATENT DOCUMENTS

| | | | | |
|---|---|---|---|---|
| 4,114,030 | * | 9/1978 | Nojiri | 235/464 |
| 4,616,266 | * | 10/1986 | Hennig | 358/280 |
| 4,698,686 | * | 10/1987 | Endo | 358/213.18 |
| 4,752,741 | * | 6/1988 | Kim | 328/165 |
| 4,992,855 | * | 2/1991 | Takei | 358/29 |
| 5,045,928 | * | 9/1991 | Takaiwa et al. | 358/41 |
| 5,146,082 | * | 9/1992 | Abe | 358/484 |
| 5,153,745 | * | 10/1992 | Brandkamp | 358/406 |
| 5,204,741 | * | 4/1993 | Sakaguchi | 358/105 |
| 5,384,595 | * | 1/1995 | Sakaguchi | 348/226 |
| 5,617,139 | * | 4/1997 | Okino | 348/227 |
| 5,875,042 | * | 2/1999 | Kashitani et al. | 358/474 |

FOREIGN PATENT DOCUMENTS

| | | | | |
|---|---|---|---|---|
| 0320889A2 | * | 6/1989 | (EP) | H04N/1/40 |
| 0062659 | * | 4/1992 | (JP) | 358/406 |

\* cited by examiner

*Primary Examiner*—Jerome Grant, II
(74) *Attorney, Agent, or Firm*—Scully, Scott, Murphy & Presser

(57) ABSTRACT

In an image pick-up apparatus, the image on a visual field over an original copy is focused on an one-dimensional image pick-up device by a lens through a mirror. A prism for taking in the ambient light is disposed at the end portion of the one-dimensional image pick-up device. A sample-hold circuit samples and holds an ambient light signal portion of the image signal Vin and outputs a sample-hold signal Vref. A division circuit performs the operation of division Vin/Vref, using the sample-hold signal Vref. As a result, the image signal Vin will be normalized by the ambient light signal Vref for each scan line (line by line). An amplification circuit amplifies the output Vin/Vref of the division circuit so that the ambient light signal level may become VO and outputs it to an A/D conversion circuit. The image signal quantified by the A/D-conversion circuit is output to an external equipment by an external I/F circuit.

10 Claims, 7 Drawing Sheets

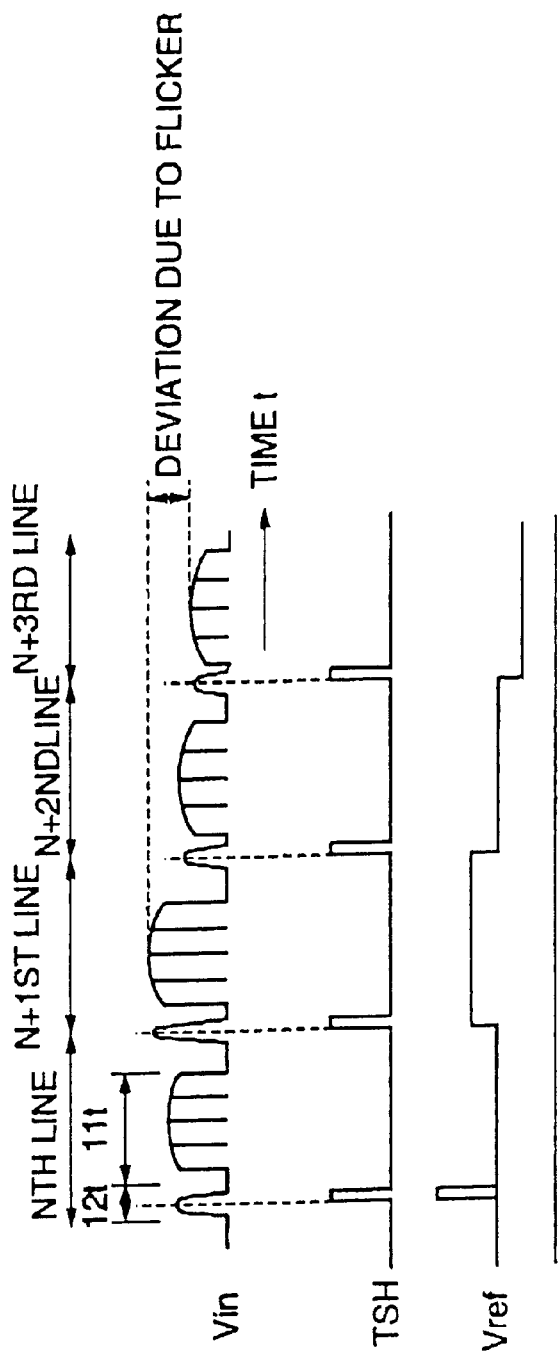

IMAGE PICK-UP APPARATUS CAPABLE OF STABLE FLICKER COMPENSATION WITHOUT INFLUENCE BY REFLECTANCE OF AN OBJECT

BACKGROUND OF THE INVENTION

The present invention relates to an image pick-up apparatus, and more particularly, to a camera type image pick-up apparatus for use in picking up pictures with light of fluorescent lamp in an ordinary room.

Conventionally, it is called "flicker" that quantity of light varies in response to the utility power frequency. An object illuminated by a light source with the flicker, such as fluorescent lamp, is often picked up by a camera having a linear image sensor. In such a case, a noise composed of a pattern of lateral stripes inevitably appears on the picked up image, when a period of driving the linear image sensor is nearly equal to that of flicker. A quality of the image is deteriorated by the noise of the pattern of lateral stripes.

A conventional image pick-up apparatus is disclosed, for example, in Japanese Unexamined Patent Publication 203286/1995 with a proposal for preventing the noise of the pattern of lateral stripes. In the conventional image pick-up apparatus disclosed in the Japanese Unexamined Patent Publication 203286/1995, as will later be described more in detail, a compensation is carried out by the use of a part of an image signal obtained from a camera by picking up an image of an actual object. It is therefore required that a reflectivity in a visual field extracting flicker components is kept constant. When an object such as a hand, an eraser, and an original copy, lies in the visual field extracting flicker components, image signals are subjected to deviation influenced by the obstacles. In the conventional image pick-up apparatus, such a deviation of image signals cannot be distinguished from that caused by flicker. As a result, the compensation cannot be correctly carried out in the conventional image pick-up apparatus.

SUMMARY OF THE INVENTION

It is therefore an object of the present invention to provide an image pick-up apparatus capable of picking up an image of high quality, in which a flicker compensation can be correctly carried out without influence by the reflectivity of an object.

Other objects of the present invention will become clear as the description proceeds.

On describing the basic operation of the present invention, it is readily understood that an image pick-up apparatus is for use in picking up an image of an original copy on an one-dimensional image pick-up device, and for capturing a two-dimensional image by mechanically scanning in a direction perpendicular to said one-dimensional image pick-up device.

According to an aspect of the present invention, the image pick-up apparatus comprising: an optical guide means for receiving an ambiance light added to a portion of said one-dimensional image pick-up device, a flicker compensation means for eliminating flicker noise of said received light using a photoelectric conversion signal of the light obtained from said optical guide means, and a flicker signal area for receiving said light output from said optical guide means and an image signal area for imaging an image of the original copy being completely separated optically in said one-dimensional image pick-up device.

The optical guide means may be disposed at an end potion of a scanning start side of said one-dimensional image pick-up device.

The light incident portion of said optical guide means may be a diffuser.

A condenser may be provided at the light output portion of said optical guide means.

The optical guide means may be composed of a prism.

The prism and said one-dimensional image pick-up device may be spaced apart and the space may be enclosed by a shading plate.

The optical guide mean may be composed of an optical fiber.

The flicker compensation means may be composed of a sample-hold circuit and a first division circuit, in which said sample-hold circuit samples and holds the photoelectric conversion output of the light obtained from said optical guide means, while said first division circuit divides an output signal of said image pick-up device by the output signal of said sample-hold circuit.

The flicker compensation means may be composed of a sample-hold circuit, a second division circuit and a multiplication circuit, in which said sample-hold circuit samples and holds the photoelectric conversion output of the light obtained from said optical guide means, and said second division circuit divides the output signal of said sample-hold circuit by a predetermined constant, while said multiplication circuit multiplies an output signal of said image pick-up device by the output signal of said second division circuit.

The flicker compensation means may be composed of an A/D conversion means and an operation means, in which said A/D conversion means quantifies a video signal output from said one-dimensional photoelectric conversion device, while said operation means executes an operation with the value of said flicker signal area and the value of said image signal area.

BRIEF DESCRIPTION OF THE DRAWINGS

FIG. 5A is a view for showing a waveform of a signal Vin illustrated in FIG. 4;

FIG. 5B is a view for showing a waveform of a signal TSH illustrated in FIG. 4;

FIG. 5C is a view for showing a waveform of a signal Vref illustrated in FIG. 4;

FIG. 5D is a view for showing a waveform of a signal Vc illustrated in FIG. 4;

DESCRIPTION OF THE PREFERRED EMBODIMENTS

Figure 1:
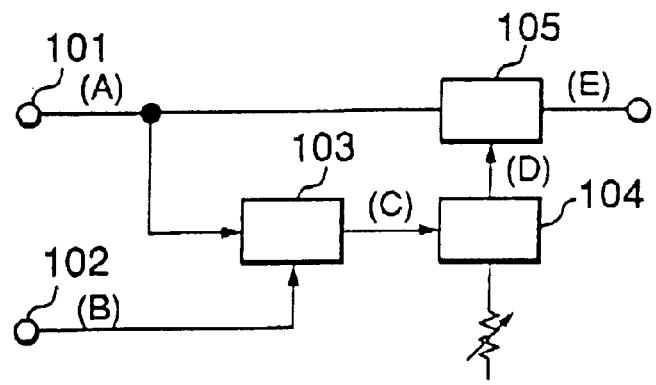
FIG. 1 is a block diagram for showing a conventional image pick-up apparatus.
Figure 2:
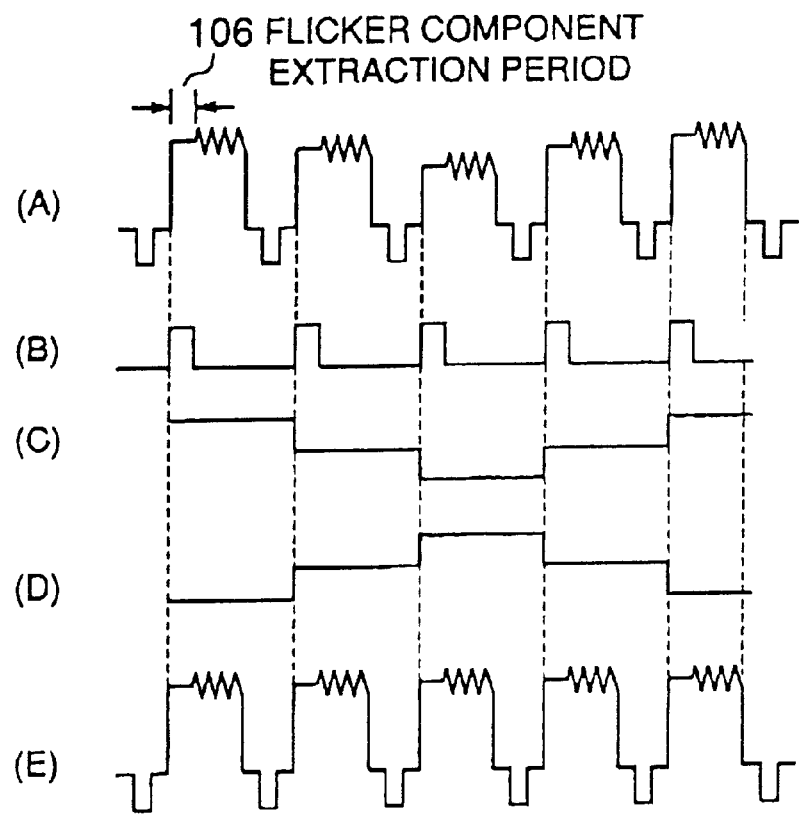
FIG. 2 is a view for showing each waveform of input/output signals (A) through (E) of the circuits illustrated in FIG. 1.

Referring to FIGS. 1 and 2, description is, at first, made about a conventional image pick-up apparatus for a better understanding of the present invention. FIG. 1 is a block diagram for showing a conventional image pick-up apparatus disclosed in Japanese Unexamined Patent Publication 203286/1995.

In the conventional image pick-up apparatus, as depicted in FIG. 1, an image signal (A) obtained from a line sensor is input to an input terminal 101 while a sampling pulse (B) is input to an input terminal 102. A sampling hold signal (C) is obtained by holding the level of a flicker component extraction period 106 by a sample hold circuit 103 with a sampling pulse (B) synchronous with the flicker component extraction period 106. This sample hold signal (C) is reversed and amplified by a corrected waveform generation circuit 104 to obtain a flicker compensation signal (D). The obtained compensation signal (D) performs the reverse compensation to the image signal (A) in an amplification circuit 105. Repeating this operation for each scan cycle of the line sensor, a flicker of the image signal can be corrected.

Referring now to FIG. 2, description proceeds to an operation of the conventional image pick-up apparatus illustrated in FIG. 1.

The waveform (A) shows an image signal waveform containing flicker components, while the sampling pulse of the waveform (B) allows to sample and hold the image level of the flicker component extraction period 106 of the image. By repeating this operation, the waveform (C) will be obtained. The waveform (D) shows a compensation signal obtained by reversing the waveform (C). The compensation signal of the waveform (D) is supplied to the amplification circuit 105 to modify the image signal gain. The flicker component of the waveform (A) is thereby compensated. The image signal waveform after the compensation is shown by the waveform (E).

In the conventional image pick-up apparatus illustrated in FIG. 1, a compensation is carried out by the use of a part of an image signal obtained from a camera by picking up an image of an actual object, as mentioned in the preamble of the instant specification. Accordingly, a reflectivity in a visual field extracting flicker components must be kept constant. If an obstacle such as a hand, an eraser, and an original copy, lies in the visual field extracting flicker components, image signals are inevitably deviated by the influence of the obstacles. In the conventional image pick-up apparatus, the deviation of image signals cannot be distinguished from that of the flicker. Consequently, a correct or stable compensation is not available in the conventional image pickup apparatus.

The present invention is devised to solve such a problem and has the object to provide an image pick-up apparatus allowing to take in a high quality image.

Figure 3:
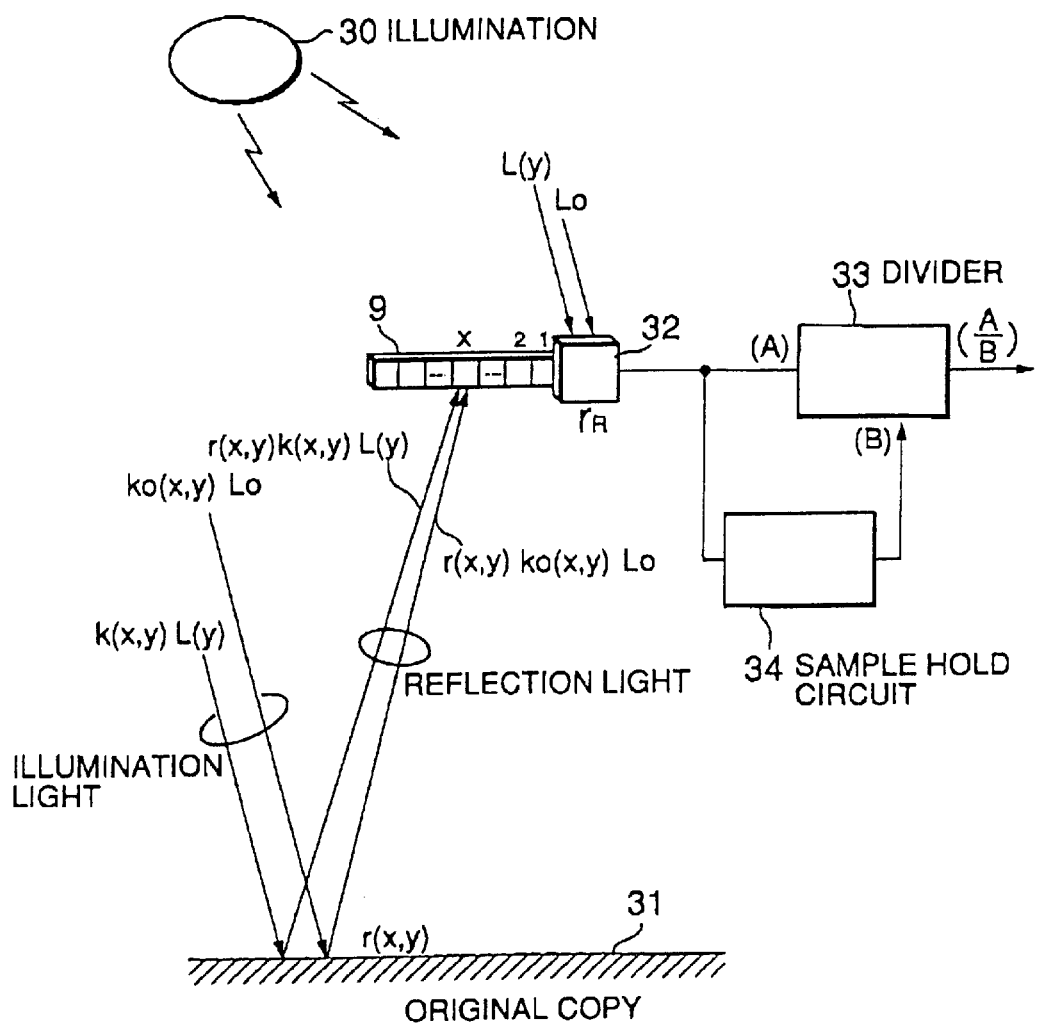
FIG. 3 is an illustrative diagram for describing the principle of the present invention.

Herein, referring to FIG. 3, description is made as regards a principle and a function of the present invention.

FIG. 3 is an illustrative drawing for describing the principle of the present invention.

FIG. 3 models the component of the incident light into the image pick-up apparatus according to the present invention. Herein, it is assumed that the illumination 30 is composed of two types of light, for example, flicker containing fluorescent lamp and ambient light free from flicker such as sunlight.

Under this condition, the compensated output Vc (x, y) corresponding to a pixel (x, y) on an original copy 31 is represented by the following equation (1):

$$Vc(x, Y)=V0*V(x, y)/Vref(y)=V0*\{K(x, y)*L(y)+K0(x, y)L0)/\{L(y)+ *L0\}*\{r(x, y)/rR\} \quad (1)$$

where Vref(y) represents a flicker detection signal, V(x, y) represents a video signal of the original copy 31, V0 represents an A/D conversion normalization level, r(x, y) represents a reflectance of the original copy, rR represents a transmittance of optical guide member, K(x, y) represents a fluorescent lamp quantity attenuation factor on the face of the original copy 31 (ratio to optical guide member incident portion 32), K0(x, y) represents an ambient light quantity attenuation factor on the face of the original copy 31 (in respect to optical guide member incident portion 32), L(y) represents a fluorescent lamp light quantity at the optical guide member incident portion 32, L0 represents an ambient light quantity at the optical guide member incident portion 32, respectively.

Herein, the fluorescent lamp light quantity is expressed by a function of y, because the luminance temporal deviation due to flicker appears as deviation in the y axis direction as the mechanical secondary scan direction during the acquisition of two-dimensional image by the one-dimensional image pick-up device is taken as the y axis. Consequently, the elimination of pattern of lateral stripes (i.e., elimination of flicker effect) means the disappearance of the term L(y) in the expression (1). The following conditions are required for this effect.

(a) L(y)=0 namely, absence of fluorescent lamp;
(b) K(x, y)=K0(x, y) namely, fluorescent lamp and ambient light attenuate by the same proportion;
(c) L0=0 namely, absence of ambient light;

However, reflectance waveform property and directivity are supposed to be identical.

The condition (b) represents the normal use state. However, the present invention meets the condition (b) approximately, because the object and the detection section are installed in the proximity.

As a result, the following function is obtained:

$$Vc(x, y)=V0*K(x, y)*\{r(x, y)/rR\} \quad (2)$$

and the term L(y) of the component representing lateral stripe noise disappears.

The resulting Vc(x, y) presents the concentration distribution normalized by the transmittance rR of the optical guide member, and lateral stripe noise due to flicker will be eliminated.

Referring to FIGS. 4 to 9, description will proceed to an image pick-up apparatus according to a first embodiment of the present invention.

Figure 4:
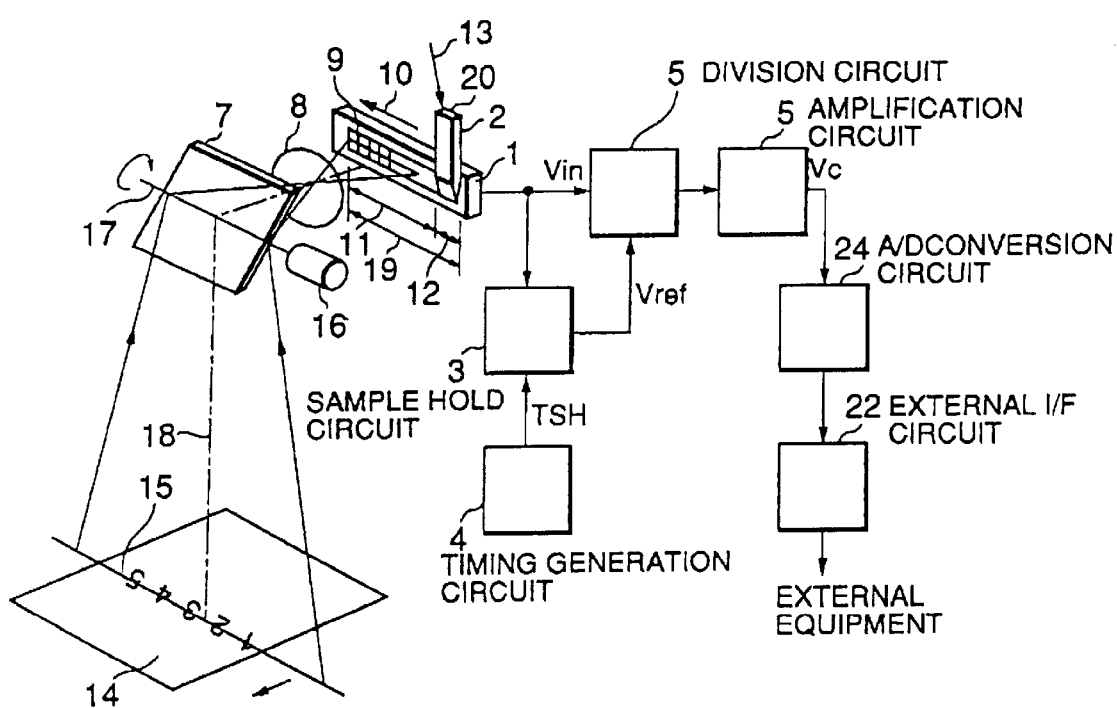
FIG. 4 is a conceptual view with a block diagram of an image pick-up apparatus according to a first embodiment of the present invention.

FIG. 4 is a block diagram showing a first embodiment of the present invention. FIGS. 5A through 5D are diagrams showing each waveform of input/output signals Vin through Vc illustrated in FIG. 4.

First, the composition of the first embodiment will be described, referring to FIG. 4.

A mirror 7 deflects the reflection light over a visual field 15. A lens 8 focuses the reflection light from the mirror 7 on a photosensor array 9 of an one-dimensional image pick-up device 1. The one-dimensional image pick-up device 1 outputs the signal photoelectrically converted by the photosensor array 9 to the exterior as an image signal in time series. A pulse motor 16 rotates the mirror around an axis 17.

A prism 2 receives an ambient light 13 and applies the ambient light to the photosensor array 9. The whole light reception area 19 of the photosensor array 9 is provided with a reception area 12 for receiving light from the prism 2 and an area 11 for picking up an image of the object. The reception area 12 and the area 11 are completely independent optically. No optical interference is therefore caused to occur. A sample-hold circuit 3 is designed to sample and hold the image signal by the prism 2 in the image signal obtained from the one-dimensional image pick-up device 1. A timing generation circuit 4 is designed to generate the timing signal for sampling the image signal by the prism 2 to supply the timing signal to the sample-hold circuit 3. The division circuit 5 is designed to divide the image signal Vin obtained from the one-dimensional image pick-up device 1 by the signal Vref obtained from the sample-hold circuit 3. An amplification circuit 6 is designed to perform the amplification required for the following circuits.

Now, referring to FIGS. 4 and 5, an operation of the image pick-up apparatus according to the first embodiment will be described.

In FIG. 4, it is assumed that characters are written in a field of an original copy 14 having a uniform reflectance. An image on a visual field 15 over the original copy 14 is focused on the one-dimensional image pick-up device by a lens 8 through a mirror 7. Here, the image signal Vin will have such a waveform as shown in FIG. 5A. In FIG. 5A, illustrated are image signals of four lines from Nth line to N+3rd line. Though the original copy presents an uniform reflectance, the signal level varies across the Nth line to the N+4th line due to an influence of the flicker. The sample-hold circuit 3 samples and holds a signal portion of the ambient light within the image signal Vin shown in FIG. 6A at the timing shown in FIG. 5B. The sample-hold circuit 3 thereby outputs a sample hold signal Vref shown in FIG. 5C. The division circuit 5 performs the operation of division Vin/Vref, using the sample hold signal Vref obtained from the sample-hold circuit 3. As a result, the image signal Vin will be normalized by the ambient light signal Vref per each scan line (line by line). The amplification circuit 6 amplifies the output signal Vin/Vref from the division circuit 5 in order that the ambient light signal level may become V0. The amplification circuit 6 supplies the amplified output signal to an A/D conversion circuit 21.

As a result, a compensated output Vc is obtained, as shown in FIG. 5D. In the compensated output Vc, the aforesaid line-by-line deviation due to the flicker is effectively prevented.

The A/D conversion circuit 21 allows to always put the ambient light signal level to the full dynamic range by setting the quantification reference level to V0. This enables the maximum use of the quantification resolution of the A/D converter. The quantified image signal is output to the external equipment by an external I/F circuit 22.

A notable feature of the first embodiment mentioned above consists in that the ambient light signal Vref for flicker compensation is obtained not from the image pick-up signal of a real object, but by providing a dedicated detection prism and obtaining the ambient light signal Vref through the photoelectric conversion of the incident light therefrom. This allows to relax restrictions on the object, since the dedicated flicker extraction area is no more necessary on the object.

Next, referring to FIGS. 6 to 9, the relaxation of ambient light directivity in this embodiment will be described.

Figure 6A:
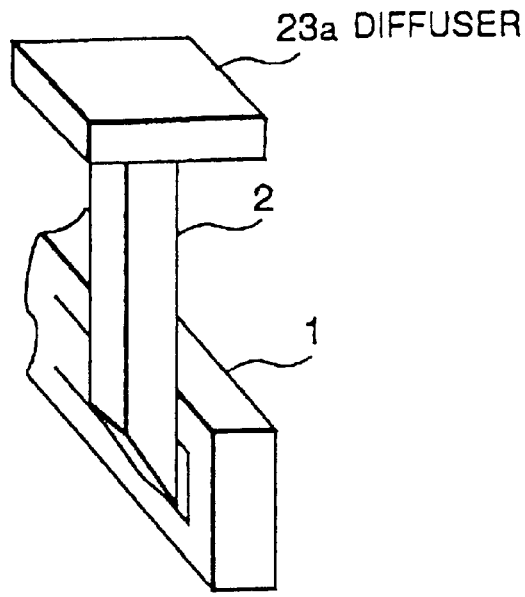
FIG. 6A is a view for showing an appearance of the light reception section of the prism illustrated in FIG. 4 when provided with a diffuser having a light reception plane of a flat shape.
Figure 6B:
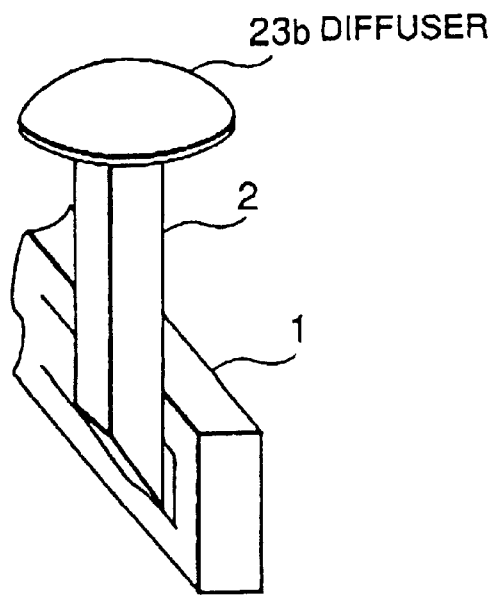
FIG. 6B is a view for showing an appearance of the light reception section of the prism illustrated in FIG. 4 when provided with a diffuser having a light reception plane of a spherical shape.
Figure 7A:
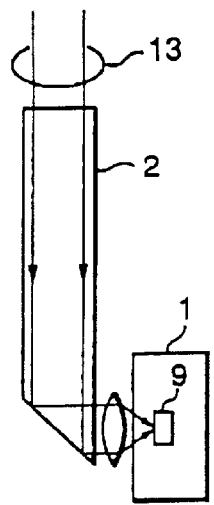
FIG. 7A is a side view for showing a state of incidence of the ambient light to the photosensor array when a lens is disposed at an output portion of the prism illustrated in FIG. 4.
Figure 7B:
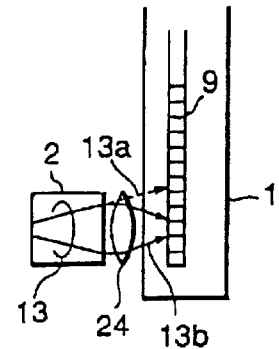
FIG. 7B is a plan view for showing a state of incidence of the ambient light to the photosensor array when a lens is disposed at an output portion of the prism illustrated in FIG. 4.
Figure 8A:
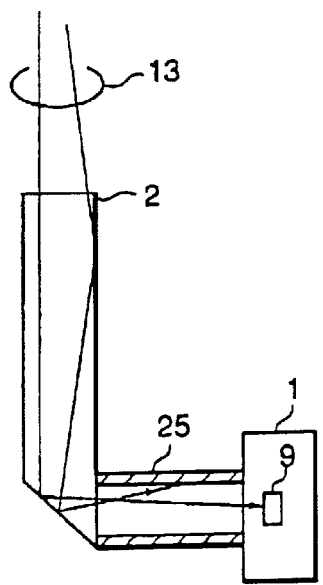
FIG. 8A is a side view for showing a state of incidence of the ambient light to the photosensor array when a shading plate is disposed at an output portion of the prism illustrated in FIG. 4.
Figure 8B:
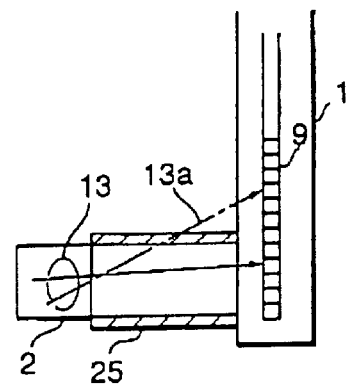
FIG. 8B is a plan view for showing a state of incidence of the ambient light to the photosensor array when a shading plate is disposed at an output portion of the prism illustrated in FIG. 4.
Figure 9:
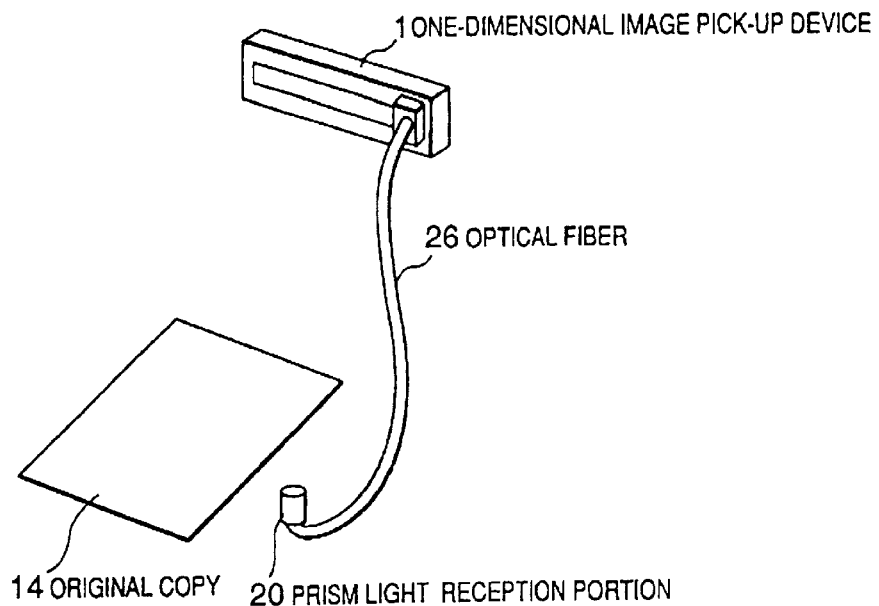
FIG. 9 is a conceptional view for showing an example of the composition in which an optical fiber is employed in place of the prism illustrated in FIG. 4.

FIG. 6A and 6B show the outer appearance of the prism light reception portion according to the first embodiment when a diffuser is provided. FIG. 6A is a view showing the case where the light reception plane is flat while FIG. 6B is a view where the light reception plane is spherical. FIG. 7A and 7B show the incidence state to the ambient light photosensor array when a lens is disposed at the prism output portion according to the first embodiment. FIG. 7A is a lateral view while FIG. 7B is a top view. FIG. 8A and 8B show the incidence state to the ambient light photosensor array when a shade plate is disposed at the prism output portion according to the first embodiment. FIG. 8A is a lateral view while FIG. 8B is a top view. FIG. 9 is a view for showing an example of the composition in which an optical fiber is employed in place of the prism mentioned above.

If the light reception portion 20 of the prism 2 is the diffuser 23 shown in FIGS. 6A and 6B, the ambient light directivity is relaxed to stabilize the compensation. Compared with the structure having the flat light reception plane shown in FIG. 6A, the directivity relaxation effect is improved in the spherical light reception plane shown in FIG. 6B. Ordinarily, a space is formed between the glass face of the pick-up device 1 and the photosensor array 9. Consequently, the ambient light sometimes leaks to the effective visual field through the space, even though the prism 2 is just contact therewith. In the example illustrated in FIG. 7, a lens 24 is disposed at the output portion of the prism 2 for preventing light from leaking into the effective visual field. For example, if no lens 24 is disposed there at, the ambient light 13 leaks into the visual field as 13a in FIG. 7B. The ambient light 13 is converged as 13b by disposing the lens 24 at the output portion of the prism 2.

The same effect can be expected by disposing apart the prism 2 and the image pick-up device 1 as shown in FIG. 8 and by shielding the light with a shade plate 25.

In the description mentioned above, the prism 2 is nothing but an example of member for taking in ambient light. Accordingly, an optical fiber 26 may be adopted in place of the prism 2, as shown in FIG. 9.

Figure 10:
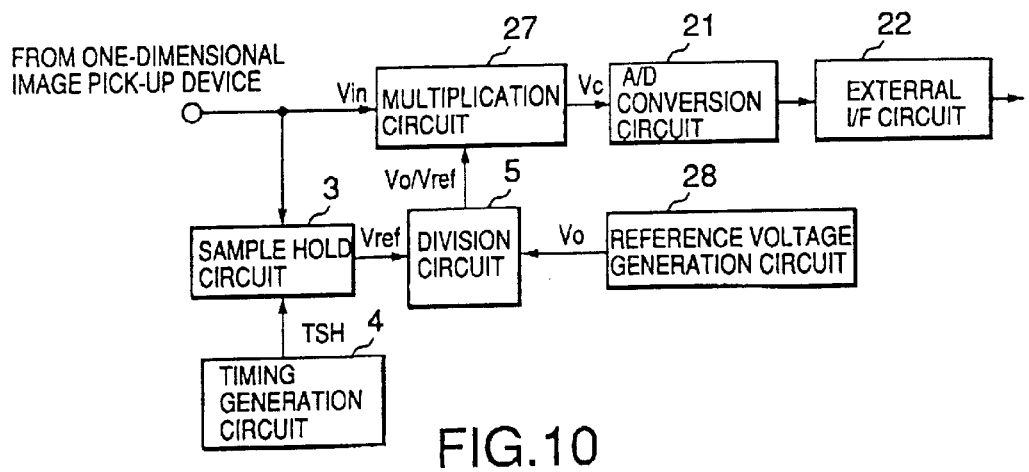
FIG. 10 is a block diagram for showing an image pick-up apparatus according to a second embodiment of the present invention.

Referring to FIG. 10, description proceeds to an image pick-up device according to a second embodiment of the present invention.

FIG. 10 is a block diagram for showing the second embodiment of the present invention.

The composition up to the output is similar to the first embodiment shown in FIG. 4 and, therefore, omitted.

In the second embodiment illustrated in FIG. 10, a sample-hold circuit 3 samples and holds the image signal by a prism 2 in an image signal obtained from an one-dimensional image pick-up device 1. A timing generation circuit 4 generates a timing signal for sampling the image signal by the prism 2 and outputs the timing signal to the sample-hold circuit 3. A division circuit 5 is designed to divide a reference voltage V0 by the signal Vref obtained from the sample-hold circuit 3. A multiplication circuit 27 multiplies the image signal Vin obtained from the one-dimensional image pick-up device 1 by the output V0/Vref from the division circuit 5. An A/D conversion circuit 21 quantifies the output signal of the multiplication circuit 27. An external I/F circuit 22 outputs the quantified image signal to the exterior.

Now the operation of this second embodiment will be described, referring again to FIG. 5 with reference to FIG. 10 continued.

Here, the image signal Vin in the second embodiment is similar to that of the first embodiment, for example, as shown in FIG. 5A. In FIG. 5A, illustrated are image signals of four lines from Nth line to N+3rd line. Though the original copy presents an uniform reflectance, the signal level varies across the Nth line to the N+4th line due to the flicker effect. The sample-hold circuit 3 samples and holds an ambient light signal portion of the image signal Vin of FIG. 5A at the timing shown in FIG. 5B and outputs a sample hold signal Vref as shown in FIG. 5C. The division circuit 5 performs the division V0/Vref, using the sample hold signal Vref obtained from the sample-hold circuit 3. Here, V0 is a voltage obtained from a reference voltage generation circuit 28 and is a level for defining the ambient light signal level. As a result, the image signal Vin will be normalized by Vref for each scan line (line by line). Consequently, a compensated output Vc as shown in FIG. 5D will be obtained, free from line-by-line deviation due to the flicker.

The A/D conversion circuit 21 quantifies the output Vc of the multiplication circuit 27 with the dynamic range of V0. The quantified image signal is output to the external equipment by the external I/F circuit 22.

Figure 11:
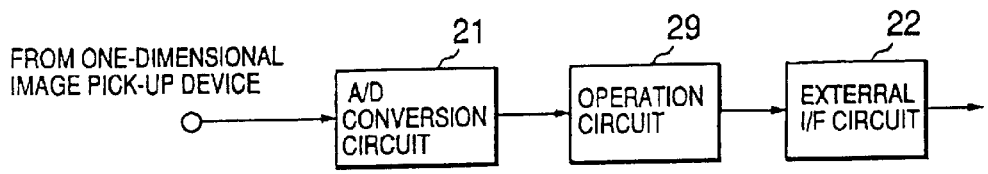
FIG. 11 is a block diagram for showing an image pick-up apparatus according to a third embodiment of the present invention.

Referring to FIG. 11, description proceeds to an image pick-up device according to a third embodiment of the present invention.

FIG. 11 is a block diagram for showing the third embodiment of the present invention.

In FIG. 11, the third embodiment up to the output an one dimensional image pick-up device 1 is similar to the first and the second embodiment and, therefore, omitted.

In the third embodiment illustrated in FIG. 11, an A/D conversion circuit 21 quantifies the output signal obtained by the one-dimensional image pick-up device 1. An operation circuit 29 performs the flicker compensation calculation and outputs the result. An external I/F circuit 22 outputs the quantified image signal to the exterior.

Now the operation of this third embodiment will be described, referring again to FIG. 5 with reference to FIG. 11 continued.

Here, the image signal Vin in the third embodiment is similar to those of the first and the second embodiments, for example, as shown in FIG. 5A.

In FIG. 5A, illustrates are image signals of four lines from Nth line to N+3rd line. Though the original copy presents an uniform reflectance, the signal level varies across the Nth line to the N+4th line due to the flicker effect. The A/D conversion circuit 21 quantifies this image signal and outputs the image signal to the operation circuit 29. The operation circuit 29 performs the following calculation line by line and output the result of the calculation.

Step 1: to acquire the ambient light signal level (Vref)
Step 2: to perform (Vin/Vref)*V0 for each pixel The external I/F circuit 22 outputs the aforesaid result of the calculation to the exterior.

As described hereinbefore, the image pick-up apparatus according to the first through the third embodiment of the present invention is composed of an optical guide member added to a part of an one-dimensional image pick-up device and a flicker compensation member for eliminating the fluorescent lamp flicker noise using the photoelectric conversion signal of the light obtained from the optical guide member. The image pick-up apparatus provides the effect of performing the flicker compensation free from the effect from the object reflectance, since the flicker signal area receiving the light emitted from the optical guide member and the image signal area for focusing the image of the original copy can be optically and completely separated in the one-dimensional image pick-up device. Accordingly, a stable flicker compensation can be assured even when, for example, a hand, an eraser or other foreign matters remains in the visual field.

The image pick-up apparatus provides another effect of producing no compensation error due to various characteristics of the photoelectric conversion device or timing deviation, because the sensor for detecting flicker component is identical with the image pick-up device for picking up the object.

What is claimed is:

1. An image detection apparatus for use in detecting an image of an original copy with a one-dimensional image detector, and for capturing a two-dimensional image of the original copy by mechanically scanning the original copy in a direction perpendicular to the one-dimensional image detector, comprising:

an optical guide means for receiving ambient light and directing the ambient light to a portion of the one-dimensional image detector, wherein the one-dimensional image detector includes a flicker signal detection area for detecting the light output from the optical guide means, and an image signal detection area for detecting an image of the original copy, wherein the flicker signal area and the image signal area are completely separated optically in the one-dimensional image detector, a flicker compensation means for eliminating flicker noise in the received light caused by the light varying in response to a utility power supply frequency, by using a photoelectric conversion signal of the light obtained from said optical guide means.

2. The image detection apparatus as claimed in claim 1, wherein said optical guide means is disposed at an end portion of a scanning start side of said one-dimensional image detector.

3. The image detection apparatus as claimed in claim 1, wherein a light incident portion of said optical guide means includes a diffuser element.

4. The image detection apparatus as claimed in claim 1, wherein a condenser lens is provided at a light output portion of said optical guide means.

5. The image detection apparatus as claimed in claim 1, wherein said optical guide means comprises an optical fiber.

6. The image detection apparatus as claimed in claim 1, wherein said flicker compensation means comprises a sample-hold circuit and a first division circuit, in which said sample-hold circuit samples and holds a photoelectric conversion output of light from said optical guide means, and said first division circuit divides an output signal of said image detector by an output signal of said sample-hold circuit.

7. The image detection apparatus as claimed in claim 1, wherein said flicker compensation means comprises a sample-hold circuit, a second division circuit and a multiplication circuit, in which said sample-hold circuit samples and holds a photoelectric conversion output of the light from said optical guide means, and said second division circuit divides an output signal of said sample-hold circuit by a predetermined constant, and said multiplication circuit multiplies an output signal of said image detector by an output signal of said second division circuit.

8. The image detection apparatus as claimed in claim 1, wherein said flicker compensation means comprises an A/D conversion means and an operation means, in which said A/D conversion means quantifies a video signal output from said one-dimensional detector, and said operation means executes an operation with a value of a signal from said flicker signal detection area and a value of a signal from said image signal detection area.

9. The image detection apparatus as claimed in claim 1, wherein said optical guide means comprises a prism.

10. The image detection apparatus as claimed in claim 9, wherein said prism and said one-dimensional image detector are spaced apart by a space which is enclosed by a shading plate.

* * * * *